(12) United States Patent
Burenga

(10) Patent No.: US 7,950,895 B2
(45) Date of Patent: May 31, 2011

(54) BUCKET BALE SPEAR

(75) Inventor: Thomas I. Burenga, Litchfield, IL (US)

(73) Assignee: Worksaver, Inc., Litchfield, IL (US)

(*) Notice: Subject to any disclaimer, the term of this patent is extended or adjusted under 35 U.S.C. 154(b) by 197 days.

(21) Appl. No.: 12/290,832

(22) Filed: Nov. 4, 2008

(65) Prior Publication Data

US 2009/0129894 A1 May 21, 2009

Related U.S. Application Data

(60) Provisional application No. 61/002,292, filed on Nov. 8, 2007.

(51) Int. Cl.
*B66F 9/12* (2006.01)
(52) U.S. Cl. .......................................... 414/724; 37/405
(58) Field of Classification Search .................. 414/724, 414/24.5, 912; 37/405, 903
See application file for complete search history.

(56) References Cited

U.S. PATENT DOCUMENTS

| | | |
|---|---|---|
| 4,674,786 A | 6/1987 | Lynch |
| D292,136 S | 9/1987 | Burenga |
| D297,848 S | 9/1988 | Burenga |
| 4,859,136 A | 8/1989 | Burenga |
| 5,016,350 A | 5/1991 | Burenga |
| 5,129,775 A | 7/1992 | Coats et al. |
| 5,240,365 A | 8/1993 | Lynch et al. |
| 5,509,770 A | 4/1996 | Burenga |
| 5,829,940 A | 11/1998 | Mahaney |
| D430,965 S | 9/2000 | Koberlein |
| 6,971,696 B1 | 12/2005 | Koester et al. |
| 2004/0253089 A1* | 12/2004 | Atencio .................. 414/724 |

* cited by examiner

*Primary Examiner* — Donald Underwood
(74) *Attorney, Agent, or Firm* — Paul M. Denk

(57) ABSTRACT

A bucket bale spear bolts together upon a frame, that slips upon the cutting edge of a bucket, and then one bolt secures the frame to the bucket. The frame receives a spear and two balance spikes upon a bracket. A centered tube accepts the spear and secures it with a transverse bolt. The tube provides additional bending resistance for the spear at less weight than a proportional length of spear. The balance spikes also bolt to the frame. The frame, spear, and balance spikes can be shipped and merchandised compactly. At the farm or the ranch, the bucket bale spear assembles readily with hand tools.

4 Claims, 3 Drawing Sheets

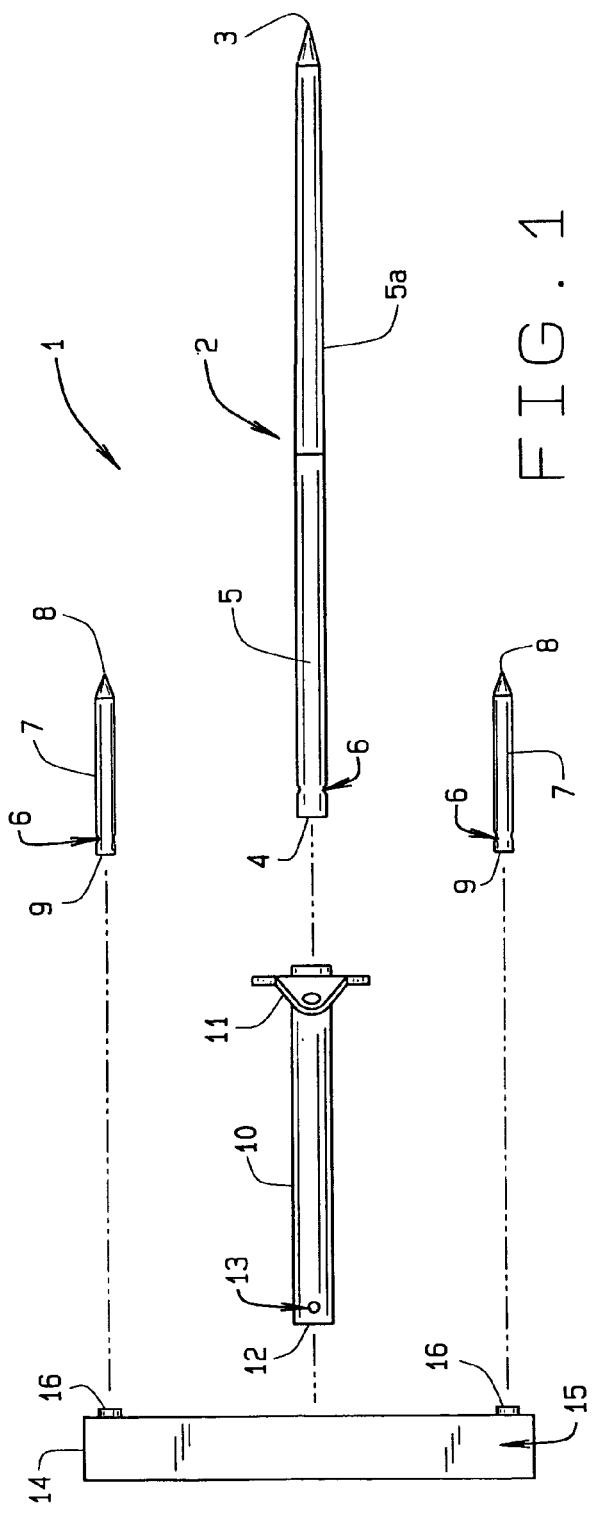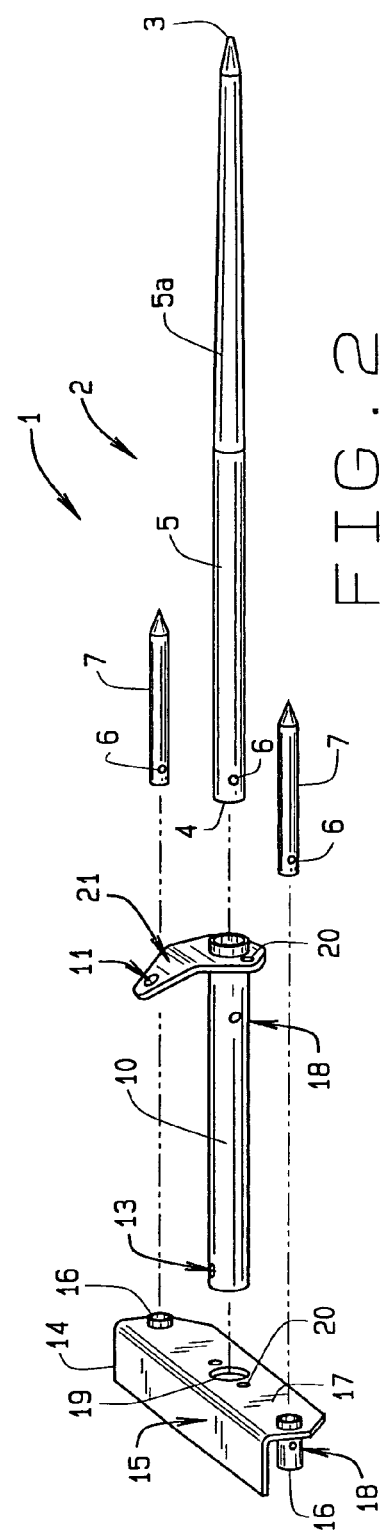

US 7,950,895 B2

BUCKET BALE SPEAR

CROSS-REFERENCE TO RELATED APPLICATIONS

This non-provisional patent application claims priority to the provisional patent application having Ser. No. 61/002,292, which was filed on Nov. 8, 2007.

BACKGROUND OF THE INVENTION

The bucket bale spear generally relates to agricultural implements and more specifically to spear with a frame secured below the bucket of a loader. Farmers and growers raise crops of various kinds including hay, alfalfa, and cotton, among others that are formed into bales for storage, handling, and transportation. The bales usually bind the dried crops, such as hay, into a stackable form such as a rectangle or a round cylinder. Bales are generally made by a machine towed, or propelled, by the farmer, or grower, at the time of harvesting the crop, such as hay in the summer. The hay, once baled, becomes feed for livestock. The hay bales can then be loaded and transported for various uses and to many locations.

Round bales have seen increasing usage over the years. The round bales are formed as hay, or other crop, is collected in windrows and then rolled into a cylinder. The cylinders are then spaced along the path of travel of a baling machine, often towed behind a tractor. A farmer can leave the bales in place until needed or the farmer can move the bales. Bales can be collected and stored for the farmer's own use or sold to other users of the bales. However, a bale can weigh well over 2000 pounds.

Generally bales are moved using forklifts, cranes, and other material handling equipment. Such equipment though has proven expensive to members of the farming community and less suited to rugged conditions encountered in the fields. Farmers seek to utilize the equipment already on a farm in new ways. Farmers often put tractors and skid loaders to improvised uses. Generally tractors and skid loaders have bucket attachments upon the front of the equipment. The bucket generally scoops up material and lifts it to a higher height, often for dumping into a pile or a truck. As a lifting attachment, buckets can also move smaller bales, or portions of a bale, placed inside them by farm hands.

DESCRIPTION OF THE PRIOR ART

As buckets have a generally rectangular front opening, a bucket grasps a bale poorly beyond ramming the bucket into a bale. Over the years, farmers have developed various spears that penetrate a bale and can support the weight of a bale when the spear is lifted. The spears include a dedicated implement connected to various pieces of equipment including tractors, wheeled or tracked loaders, dozers, and the like. A dedicated spear lifts and moves bales at the command of the equipment operator. However, the dedicated spear limits the equipment to performing bale moving tasks. Beyond towing classic agricultural implements, tractors are fitted with arms and hydraulics to perform loading tasks on the farm or ranch. The spears also include temporary implements that attach directly to a bucket or blade already fitted to a piece of equipment. Other tasks require the operator to change the implement from the arms fitted upon a tractor as loader, resulting in down time for the tractor and a storage requirement for the bale implement.

Temporary implements generally attach to the bucket of a tractor in a removable manner. The temporary bale implement lightly limits the tractor to bale tasks as the temporary bale implement removes and installs readily to a bucket. When using a temporary bale implement, the bucket remains attached to the arms of the tractor and need not be removed as in the dedicated spear implement implement usage. A tractor operator can readily switch from bale moving to lifting a load in the bucket by detaching the bale implement from the bucket.

Some temporary spear implements attach to a bucket using a chain and turnbuckle. The temporary spear is centered upon the bucket, generally upon the cutting edge, and a chain extends from a turnbuckle near the spear across the bucket, around the bucket, and return to the spear. Adjustment of the turnbuckle increases the tension on the chain and the friction of the chain upon the bucket thus securing the spear to the bucket without drilling a hole through the bucket. The chain and turnbuckle resist lateral movement, rotation, and bending of the spear when under the load of a bale. Some farmers and ranchers prefer this installation method.

Other temporary spear implements mechanically connect to a bucket. The implement has a frame that fits upon the cutting edge of the bucket and a spear extends from the frame outwardly from the cutting edge. As a spear is removed from a bale, friction retains the spear in the bale and the tractor exerts a pulling force through the bucket to release the spear. The pulling force is transmitted through a bolted connection of the frame upon the bucket. The bolt hole is generally drilled through the bucket near the bottom, or the end of the spear. Though this installation method allows for ready mounting and demounting of the spear implement, a hole remains in the bucket. As the hole is near the bottom, other uses of the bucket may cause leakage of fluids, gases, or granular matter from the hole upon the tractor, personnel, or the ground. Such leakage can cause a noticeable mess. Some farmers and ranchers dislike this installation method.

Alternatively, the spear implements shed their temporary nature and become permanently attached to a bucket by welding. The spear, welded at a minimum of two places, transmits the pulling and pushing forces from the bucket to to the bale without penetrating the bucket. However, the welding dedicates the spear to the bucket and limits the other uses of the bucket.

For each installation method, the bale implement has a spear attached to a frame where the frame connects to a bucket. The prior art frames have welded sockets that receive the spears. The sockets join to an elongated bracket by welding that also secures the balance spikes. The balance spikes insert within a bale and prevent inadvertent rotation, or turning, of the bale leading to a bale falling off the spear. Opposite the spear and spikes, the frame has two spaced apart angled members upon the bracket coming to a point away from the frame for securing beneath the bucket as previously described. The angled members prevent lateral rotation of the frame when under load, such as when the tractor turns carrying a bale. However, the welded frame of bracket, angled members, and sockets become an ungainly shape. The shape of the frame increases packaging costs, shipping expenses, warehousing fees, and retail merchandising efforts.

The present invention overcomes the disadvantages of the prior art and provides a bucket bale spear, shoe, and balance spikes mutually connected with bolts upon a frame that is then connected to a bucket by bolting or a turnbuckle as desired by the farmer or rancher. The bolt together frame allows for compact shipping, efficient warehousing, and ready handling and display of the components of the bale spear.

SUMMARY OF THE INVENTION

Generally, the present invention of a bucket bale spear bolts together, slips upon the cutting edge of a bucket, and then uses one bolt to secure to the bucket. The bucket bale spear has a frame that receives a spear and two balance spikes. The frame has a centered tube that accepts the spear and secures it with a secures it with a transverse bolt. The tube extends outwardly from the frame and opposite the spear. The tube provides additional bending resistance for the spear at less weight than a proportional length of spear. The balance spikes also connect to the frame using bolts. The frame, spear, and balance spikes can be shipped and merchandised in a compact form. At the farm or the ranch, the bucket bale spear assembles readily in minutes with hand tools.

There has thus been outlined, rather broadly, the more important features of the invention in order that the detailed description thereof that follows may be better understood and that the present contribution to the art may be better appreciated. The present invention also includes a bracket that rests upon the cutting edge of a bucket, two parallel and spaced apart sockets upon the bracket for the balance spikes, a flange welded upon one end of the tube, and a hole in the flange for attachment of chain and turnbuckle. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the bucket bale spear is to provide a bale spear that can be shipped, stored, and retailed in a compact form.

Another object of the bucket bale spear is to provide such a bale spear that readily assembles upon a bucket of a tractor, Bobcat®, loader, or other prime mover.

Another object of the bucket bale spear is to provide such a bale spear that secures to a bucket with either a bolted connection or a chain and turnbuckle around the bucket.

Another object of the bucket bale spear is to provide such a bale spear that avoids a mechanical, or a welded, connection to the cutting edge of a bucket.

Another object of the bucket bale spear is to provide such a bale spear that has a low cost of manufacturing so the farmers, ranchers, Co-Ops, haulers, elevators, yards, and depots can readily purchase the bucket bale spear and its component parts through existing retail outlets.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 1 shows a top exploded view of the bucket bale spear of the present invention, generally ready for assembly;

FIG. 2 describes a perspective view of the bucket bale spear ready for assembly;

The same reference numerals refer to the same parts throughout the various figures.

DESCRIPTION OF THE PREFERRED EMBODIMENT

Figure 3:
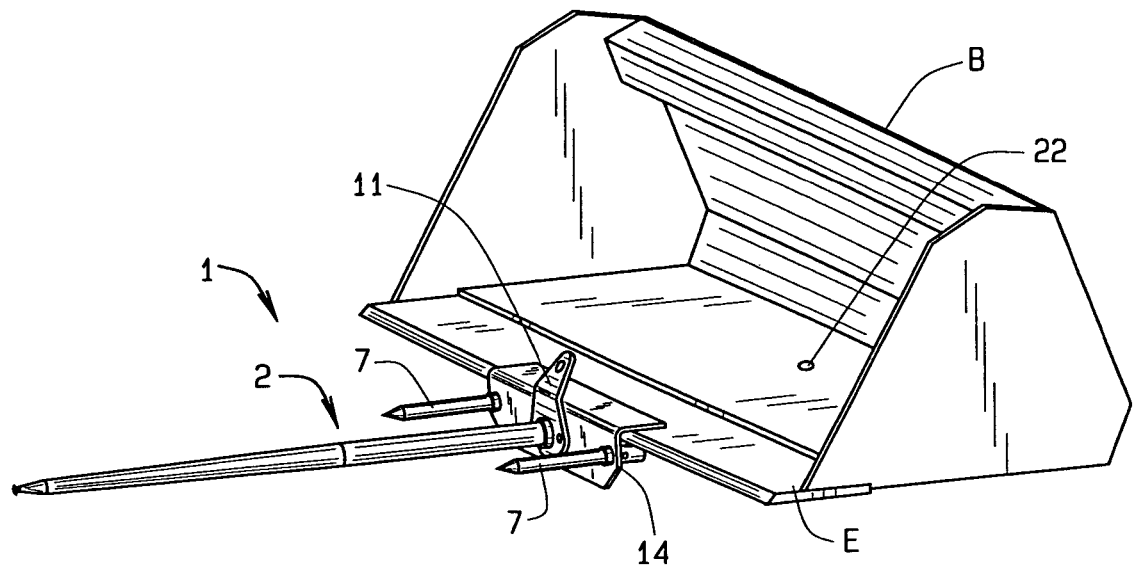
FIG. 3 is a perspective view of the bucket bale spear upon a bucket.

The present invention overcomes the prior art limitations by providing a bucket bale spear that assembles with hand tools. For a bolted connection to a bucket, a farmer or a rancher, cuts or drills, a hole at a predetermined location to secure the present invention. As later described in FIG. 5, a farmer, or a rancher, not desiring a hole in the bucket may connect the invention to a bucket using a chain and turnbuckle. Beginning the description with what a farm hand sees prior to attachment of the invention upon a bucket, FIG. 1 shows a top view of the parts of the bucket bale spear 1. The present invention has a spear 2 with a pointed tip 3 denoting the front of the invention. Opposite the tip, the spear has a base 4. Between the tip and the base, the spear has a shaft 5 that may include a tapered include a tapered portion 5a before the tip 3. Proximate the base, the shaft has an aperture 6 extending across its diameter slightly inward from the base. Spaced apart and mutually parallel, two balance spikes 7 flank the spear 2. Each spike has less length than the spear, generally less than one third. Each spike has a tip 8 and an opposite base 9 that also has an aperture 6 therethrough.

Behind the spear and spikes, the present invention has a tube 10 generally centered that receives the spear 2. The tube has an inside diameter of sufficient width to receive the base 4 of the spear. The tube has a front end to which attaches a flange 11, locating proximate the spear. The flange is generally planar and extends outwardly from the tube. In the preferred embodiment the flange is welded to the tube. Opposite the flange, the tube 10 has a base 12, generally open. Inward from the base, a second aperture 13 extends through the tube, generally perpendicular to the previous apertures 6 and the bucket as later shown.

The tube 10 and spikes 7 connect to a bracket 14 that rests upon the cutting edge of a bucket as later shown. The bracket is generally assembled perpendicular to the tube and spikes and has an L-shaped cross section. In this figure, the flange 15 appears and ahead of the flange two spaced apart sockets 16 attach to the bracket. The sockets 16 receive the bases 9 of the spikes while the bracket receives the flange 11 of the tube.

Having described the components of the present invention, FIG. 2 further shows the assembly of the spikes and spear upon the frame. Each spike 7 and the shaft of the spear 5 insert into the bracket 14. The bracket has a flange 15 that rests upon a cutting edge of a bucket and a web 17 perpendicular to the flange. The web has two mutually parallel and spaced apart sockets 16 generally made of tubes. Each socket has a bolt hole 18 extending through the diameter of the diameter of the socket and the axis of the bolt hole is generally parallel to the flange. In usage, the base 9 of a spike is inserted into the socket 16 and the aperture 6 aligned with the bolt hole 18 for securing of the spike with a bolt through the aligned bolt hole and aperture.

Centered upon the web and between the sockets, the frame has an opening 19 that receives the rear 12 of the tube 10. The opening is generally round and slightly larger than the diameter of the rear 12. Though a round tube and opening are described, alternate cooperating shapes are possible such as square or rectangular. Flanking the opening, the web has two additional bolt holes 20 generally upon the common centerline of the opening and the sockets 16. The bolt holes 20 upon the web align with bolt holes 20 upon the flange 11. In usage, the tube is inserted, by the rear, into the opening 19. Then the flange 11 is placed against the web so that the bolt holes 20 align. Then the flange is bolted to web through the aligned bolt holes. The flange also has a tab 21 extending outwardly and generally upwardly towards the bucket when the invention is installed. The tab bends inwardly in the direction of the bucket and narrows in width, coming to a rounded point. Proximate the point, the tab has an opening for receiving a hook, link of chain, or a turnbuckle for installation of the invention. Alternatively, the opening can receive a rope or cable to assist the invention, upon a bucket, in lifting an object.

For assembly of the invention as later shown in FIGS. 3, 4, 5, the tube has a bolt hole 18 located towards the flange and a second bolt hole 13 located towards the rear of the tube and opposite the flange. When the flange 11 is bolted to the web 17, the tube extends behind the bracket. The bolt hole 18 has an axis generally parallel to the bolt holes 18 in the sockets, the axis being generally horizontal. The second bolt hole 13 extends through the tube and has an axis generally perpendicular to the bolt hole 18 towards the flange. In usage, the the base 4 of the spear is inserted into the tube. Then the aperture 6 on the spear is aligned with the bolt hole 18 and a bolt placed through the bolt hole and aperture secures the shaft within the tube. The shaft generally contacts the interior of the tube proximate the flange and at the bolted connection. The two points of contact transfer the shear forces and bending moments of the spear to the tube and into the bucket. The two points of contact thus transfer the lifting forces of the bucket to the spear through the tube. The hollow cross section of the tube provides a high moment of inertia to resist the bending moments applied at the connection of the spear to the tube.

The assembled invention takes form in FIG. 3 as the bracket 14 with spear 2 and spikes 7 attached connects to a bucket B, particularly resting upon the cutting edge E. The present invention is centered upon the cutting edge with the flange 15 upon the upper surface of the cutting edge and the tab 21 is inclined into the bucket. Along the centerline established by the spear 2, the bucket has an aperture 22 through the front plate of the bucket. The aperture has sufficient width to admit at least a ½-inch diameter bolt. With the flange upon the cutting edge, the base 4 of the spear and the bases 9 of the spikes extend through the web into the tube and sockets respectively outward of the cutting edge. The spear generally extends perpendicular to the cutting edge and is ready to grasp a bale of hay in a balanced manner upon a tractor, loader, Bobcat®, or other prime mover.

Figure 3A:
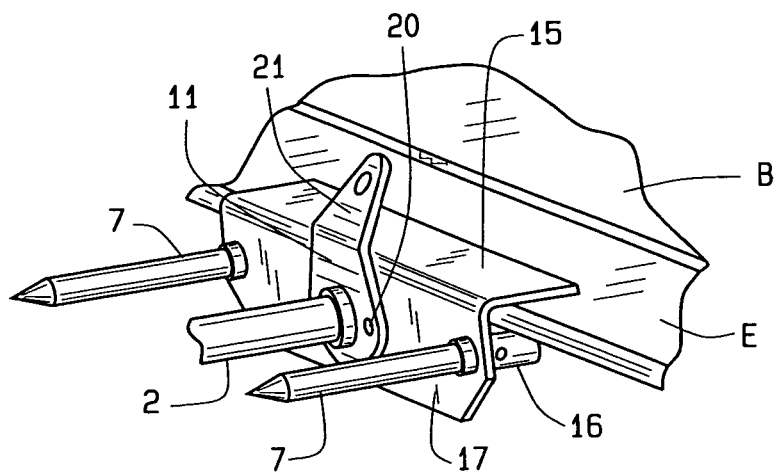
FIG. 3A is a detailed view of the frame resting upon the cutting edge of a bucket.

In closer detail, FIG. 3A shows the bracket upon the cutting edge E. The flange 15 rests upon the upper surface of the cutting edge and the web 17 abuts the precise cutting edge. The flange of the tube has a location outward of the cutting edge with the tab 11 extending therefrom upwardly and slightly into the bucket. Below the tab, the web extends generally perpendicular to the cutting edge and outward, or below, the cutting edge providing room for the sockets 16 and the tube. The spikes 7 are inserted into the sockets and after aligning the bolt holes 18 with the aperture 6, each spike is secured to the bracket. The spear 2 inserts into the tube and is also secured as shown in FIG. 4.

Figure 4:
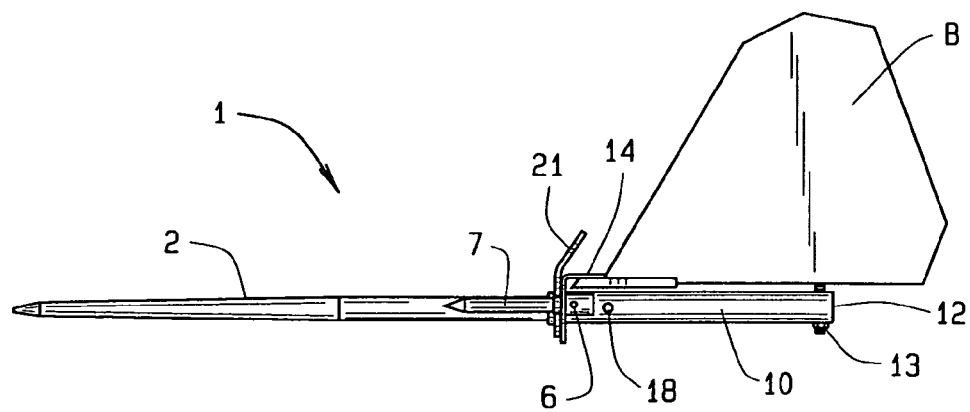
FIG. 4 describes a side view of a bucket with the bucket bale spear attached.
Figure 5:
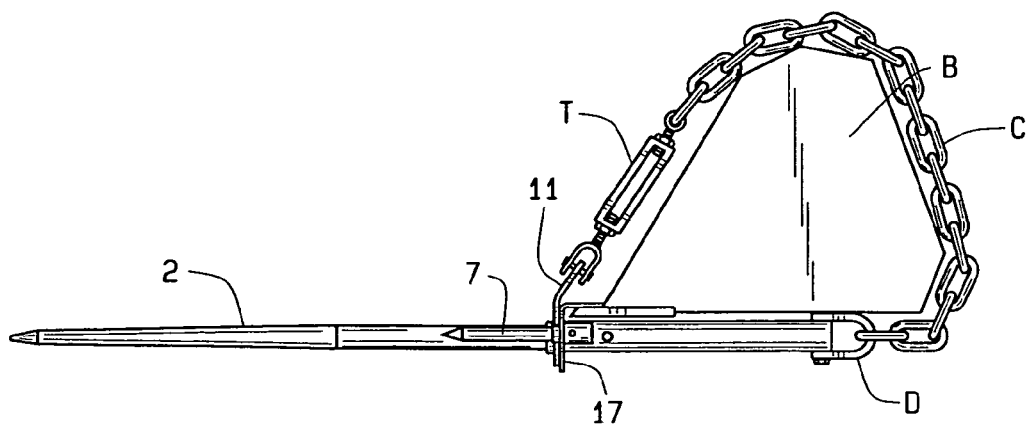

Viewing the bucket B from the side, FIG. 4 shows the spear 2 and spikes 7 installed upon the bracket 14 and the bucket. As described in FIG. 3A, the bracket rests upon the cutting edge with the tab 11 upwardly. Behind the tab, the tube 10 extends towards the bottom of the bucket and has the bolt hole 18 at a distance similar to where the edge of the bucket meets the sidewall. The spear is secured at one location by aligning the bolt hole 18 with the aperture 6 near the base of the spear and then inserting a bolt through the aligned hole and aperture. The tube 10, and indirectly the spear, secures to a second location below the aperture 22 in the bucket. The rear 12 of the tube is positioned proximate the aperture. Then the tube is secured by aligning the bolt holes 13 with the aperture 22 and inserting a bolt 23 through the holes and aperture.

Figure 4A:
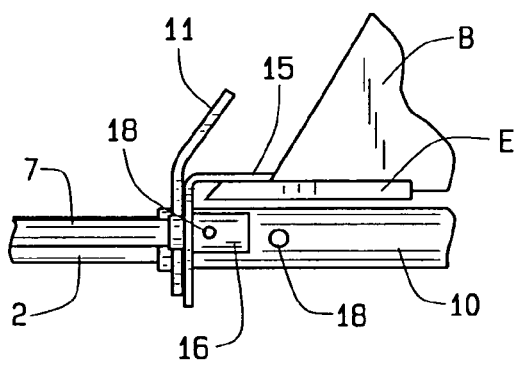
FIG. 4A is a detailed view of the frame resting upon the cutting edge of a bucket and the tube extending beneath the bucket.

The forward connection of the bracket 14 upon the cutting edge E is shown in FIG. 4A. Each spike inserts into a socket 16 where the aperture 6 is aligned with the bolt hole 18 and is then secured with a bolt. The spear 2 inserts into the tube 10 with the tip locating away from the tube. The rear 12 is then advanced within the tube so that the aperture 6 aligns with the bolt hole 18. A bolt, as at 23, then secures the spear to the tube. As before, the bracket 14 rests upon the top surface of the cutting edge with the flange generally abutting and parallel to the cutting edge. The web extends below the cutting edge and the spear and spikes protrude from the web, mutually parallel, and away from the bucket ready to receive a bale of hay or other farm products.

Figure 4B:
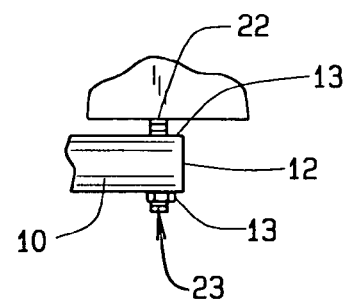
FIG. 4B is a detailed view of the bolted connection of the tube to the bucket; and, FIG. 5 shows a side view of a bucket with the bucket bale spear secured by a chain and turnbuckle around the bucket.

The second connection of the tube to the bucket appears in FIG. 4B from the side. Here, the tube extends parallel to the bucket and slightly spaced away from the bucket. The rear 12 of the tube is positioned slightly closer to the bottom of the bottom of the bucket than the aperture 22. After aligning the bolt holes 13 with the aperture 22, a bolt 23 is placed through the bucket and the tube and then secured by a nut upon the tube opposite the bucket. Preferably, the bolt is ½-inch diameter with a cooperating nut.

The preceding description primarily refers to a bolted connection of the bale spear 1 with a bucket B. The present invention also permits attachment by a chain and turnbuckle combination where the friction between the chain and the bucket and the tension induced on the chain by the turnbuckle retain the bale spear in position without drilling a hole in the bucket. The chain and turnbuckle installation of the invention is shown in FIG. 5. As before, the bracket 14 rests upon the cutting edge of a bucket. The flange 15 abuts the cutting edge and the flange 11 of the tube extends upward from the cutting edge and the tab 21 of the flange extends into the bucket. The spikes fit into their sockets and the spear fits into the front of the tube for securement by bolts through aligned bolt holes 13 and apertures 6. In this alternate method of installation, a turnbuckle T connects to the opening in the tab 21. Opposite the tab connection, the turnbuckle connects to a chain C. The chain then spans over the opening of the bucket and wraps behind and below the bucket. Opposite the connection of the chain to the turnbuckle, the chain connects to a clevis D. The clevis then extends its bolt through the bolt holes 13 upon the rear 12 of the tube. Turning the turnbuckle then applies tension to the chain which pulls and retains the present invention upon the cutting edge of a bucket under the loading of a bay of hale.

From the aforementioned description, a bucket bale spear device has been described. The device is uniquely capable of compact shipment and storage, and assembly using hand tools. The device and its various components may be manufactured from many materials, including but not limited to, steel, polymers, ABS plastic, polyvinyl chloride, high density polyethylene, polypropylene, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Heretofore, those skilled in the art have not recognized tapered ends as suitable for connections of adjacent parts in ductwork. Therefore, the claims include such equivalent constructions insofar as they do not depart from the spirit and the scope of the present invention.

I claim:

1. A device that receives a bale of agricultural product and that attaches to a bucket of a piece of equipment wherein said device disassembles into a compact form for storage and shipment, comprising:
   - a spear having a narrow elongated shape and a pointed tip, a tapered section behind said tip, a shaft behind said tapered section, and a base of said shaft opposite said tip; said shaft having an aperture therethrough proximate said base;
   - at least one spike having a pointed tip and an opposite rear, and an aperture therethrough proximate said rear;
   - a frame engagable upon the lower cutting edge of the bucket, said frame including an elongated tube receiving said spear, a bracket receiving said tube, and at least one socket mutually parallel and spaced away from said tube, and at least one socket receiving one of a spike;
   - said tube having a front and an opposite rear, a flange fitting upon the circumference of said tube proximate said front, said flange having at least one bolt hole locating off center, a tab extending outwardly from said flange and deflecting away from said front, said tab having an aperture therethrough, said tube having a bolt hole therethrough away from said flange said bolt hole aligning with said aperture of said spear for securement by bolting, and said tube having a second bolt hole proximate said rear and upon an axis perpendicular to the axis of said first bolt hole generally perpendicular to said bucket when installed upon its lower cutting edge;
   - said bracket having a web and at least one flange perpendicular to said web, said flange restable upon the bucket, said web having a centered opening receiving said tube and at least one bolt hole outwardly of said opening and cooperating with said bolt hole upon said flange, said socket attaching to said web with an opening of said socket on a common centerline with said centered opening, each of said sockets having bolt hole therethrough and aligning with the aperture of each of said spikes for securement by bolting.

2. The bale receiving device of claim 1 further comprising:
   - said device securable to a bucket upon at least two locations including said flange of said bracket resting upon a lower cutting edge of said bucket and said web extending away from said cutting edge, and said second bolt hole aligning with a hole in the bucket and a bolt securing through said second bolt hole and the hole in the bucket;
   - wherein said device transfers the loads imposed upon said spear to said bucket.

3. The bale receiving device of claim 1 further comprising:
   - said device securable to a bucket upon at least one location including:
   - said flange resting upon a cutting edge of said bucket, said web extending away from said cutting edge, and said tab extending into said bucket;
   - a turnbuckle adapting to connect to said tab and to extend across said bucket and a chain adapting to connect to said turnbuckle opposite said tab;
   - said chain extending around said bucket;
   - said second bolt hole locating away from said web and opposite said flange and said second bolt hole connecting to the chain;
   - wherein said device as secured between the chain and the turnbuckle transfers the loads imposed upon said spear to said bucket without altering said bucket.

4. The bale receiving device of claim 1 and wherein said tube partially extending forwardly of said frame for holding said spear, and the remaining part of said tube extendable rearwardly under the bucket for further support of the tube and its received spear when the bale receiving device is used.

* * * * *